June 30, 1959 J. HOLZER 2,892,980

BINARY PULSE MODULATOR

Filed June 4, 1956 3 Sheets-Sheet 1

INVENTOR.
JOHANN HOLZER

BY

Harry M. Saragovitz

ATTORNEY

June 30, 1959 J. HOLZER 2,892,980

BINARY PULSE MODULATOR

Filed June 4, 1956 3 Sheets-Sheet 2

INVENTOR.
JOHANN HOLZER

BY

Harry M. Saragovitz
ATTORNEY

INVENTOR.
JOHANN HOLZER
BY
Harry M. Saragovitz
ATTORNEY

United States Patent Office 2,892,980

Patented June 30, 1959

2,892,980

BINARY PULSE MODULATOR

Johann Holzer, Long Branch, N.J., assignor to the United States of America as represented by the Secretary of the Army Application June 4, 1956, Serial No. 589,346

9 Claims. (Cl. 332—14)

(Granted under Title 35, U.S. Code (1952), sec. 266)

The invention described herein may be manufactured and used by or for the Government for governmental purposes, without the payment of any royalty thereon.

This invention relates to electrical intelligence signal transmission systems and more particularly to an improved delta-type modulation transmission system.

The conventional delta modulation transmission system may be considered as a pulse frequency modulation system in which the time between pulses is quantized and in which the frequency of the output pulse series is proportional to the first derivative of the function of time of the input information signal. A quantized signal approximating the form of the modulating signal is generated and compared with the modulating signal at successive time intervals in a manner such that if the approximated quantized signal is smaller than the input signal, a pulse is transmitted and the amplitude of the approximated signal is increased a prescribed amount to the next higher quantum level. But if the approximated signal is larger than the input signal, the pulse is suppressed and the approximated signal is decreased to the next lower quantum level. The approximated signal is also reconstructed at the receiver as the received pulses pass through an integrator. One such modulation system is described in Phillips Technical Review, March 1952, pages 237–245. A serious disadvantage of such a system and other similar systems operating on the delta modulation principle is that any errors at the receiver caused by incorrect interpretation of the intended amplitude of a transmitted pulse will be cumulative in nature. The deleterious effect of such cumulative errors is readily apparent inasmuch as such errors will cause the quantum level at the receiver to be shifted to incorrect or different quantum levels which may approach amplitudes beyond which the receiver will not respond. Another apparent limitation in the application of conventional delta modulation systems is that it is not possible to distinguish between different amplitude levels of direct-current signals.

It is therefore an object of the present invention to provide an improved signal transmission circuit wherein such limitations are overcome.

It is another object of the present invention to provide a simple, yet more efficient, signal transmission system where the quality of the received signal is greatly improved.

It is still another object of the invention to provide a more efficient signal transmission system wherein every direct-current level provides a discrete code output.

It is a further object of the present invention to provide a signal transmission system wherein the errors due to incorrect interpretation of the transmitted signal are not cumulative.

In accordance with the present invention there is provided a delta type modulator transmission circuit which includes means responsive to the input modulating signal whereby the input signal is reconstructed in approximately the same form at a prescribed voltage level displaced therefrom. Means are also included for generating pulses only when the difference between the reconstructed voltage and the input signal is less than the prescribed level, the recurring rate of the pulses being a function of the sum of the amplitude and slope of the input signal. In addition, means are included for quantizing the reconstructed signal.

For a better understanding of the invention together with other and further objects thereof, reference is had to the following description taken in connection with the accompanying drawings in which.

Figure 1:
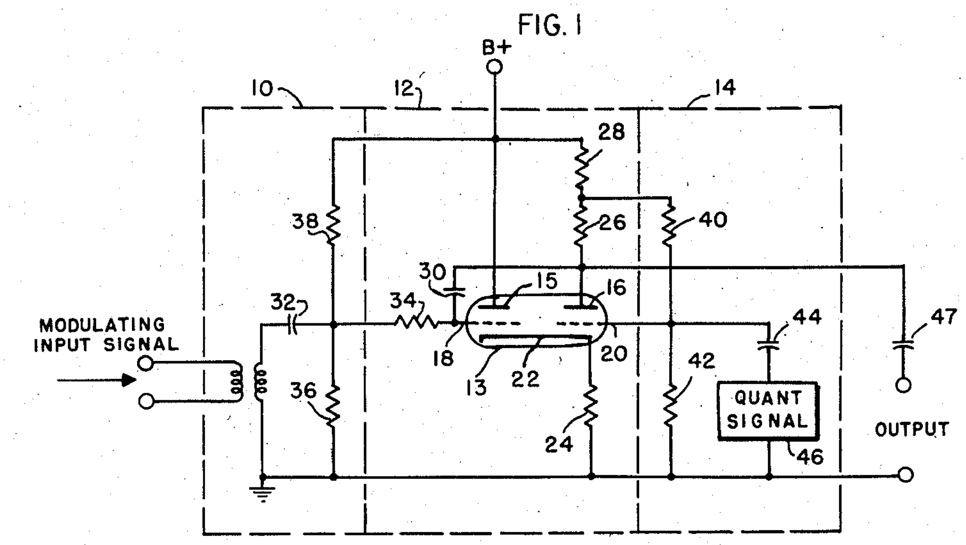
Fig. 1 is a schematic diagram of the present invention.

Referring now to Fig. 1 of the drawing, there is shown a pulse transmitter comprising an input circuit 10, a pulse generator 12 and an integrating circuit 14. The pulse generator 12 includes a twin triode tube 13 which essentially includes two triodes having respective plates 15 and 16, respective grids 18 and 20, and a common cathode 22. Cathode 22 is connected to ground through resistor 24 and plate 15 is connected directly to B+ as shown. The input to pulse generator 12 is applied to grid 18 through coupling capacitor 32 and grid current limiting resistor 34. Plate 16 is connected to B+ through series connected resistors 26 and 28, and the pulse output from plate 16 is coupled to input grid 18 through capacitor 30. Direct-current bias is applied to grid 18 by means of resistors 36 and 38 connected in series between B+ and ground, with the junction of these resistors connected to grid 18 through the current limiting resistor 34. The value of capacitor 30 is chosen so that it effectively combines in circuit with resistor 34 to form a differentiating circuit for the pulses fed back from plate 16 to grid 18, and the value of coupling capacitor 32 is chosen to provide a very low impedance path for the pulse signals fed back from plate 16. Grid 20 is direct-current biased by means of resistors 40 and 42 connected between the junction of resistors 26 and 28 and ground, with grid 20 being connected to the junction of resistors 40 and 42. Also coupled to grid 20 is a capacitor 44 which is connected to ground through a low impedance quantized signal source, or pulse generator, 46. The value of capacitor 44 is chosen so that it combines in circuit with resistors 40 and 42 to form an integrating network for the voltage pulses fed back from plate 16 through resistors 26 and 40 to grid 20. The output from pulse generator 12 is coupled from plate 16 through capacitor 47 as shown.

Figure 2:
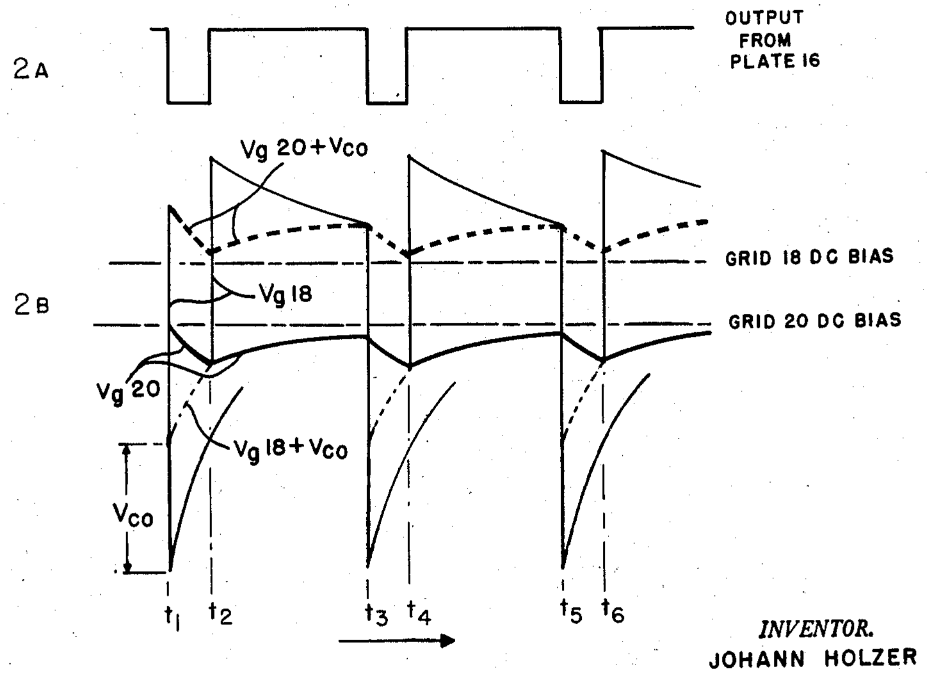
Figs. 2–5 are explanatory curves illustrating the operation of the present invention.

At this point it will be advisable to explain the operation of the pulse generator 12 and its associated integrating circuit 14 without any input signal being applied to input grid 18 and without any quantizing pulses being applied to grid 20. The left half of tube 13 acts as a cathode follower so that the voltage developed across cathode resistor 24 is substantially the same as the voltage at grid 18. The cut-off voltage for each half of the tube 13 is that voltage between grid and cathode of either one of the two triodes at which either one starts to conduct. This cut-off voltage, of course, is constant for a given plate supply voltage B+ for a prescribed type of tube. Referring now to Figs. 1 and 2, let it be assumed that the right side of tube 13 is rendered conductive first. The negative pulse generated at plate 16 will be coupled to grid 18 by means of the RC differentiating network including capacitor 30 and resistor 34. As a result, the left side of tube 13 is driven beyond cut-off and the voltage at this instant is indicated at $t_1$ by the thin solid line $V_{g18}$ in Fig. 2B. Simultaneously, a portion of the negative voltage developed across plate 16 is applied to grid 20 by means of integrating circuit 14 so that voltage at grid 20 will begin to charge exponentially in a negative direction towards the voltage level established by the voltage at the junction of resistors 26 and 28 and the voltage divider action of resistors 40 and 42 in a manner determined by the parameters of the integrating network. This curve is represented by the thick solid line $V_{g20}$. The right side of tube 13 will remain conductive and $V_{g18}$ will increase as capacitor 30 discharges through resistor 34 until such time that the difference between the voltage on grid 18, $V_{g18}$, and the voltage on grid 20, $V_{g20}$, is less than the cut-off voltage, $V_{co}$, of the tube. This point is reached at time $t_2$ where the curve $V_{g18}+V_{co}$ intersects the voltage $V_{g20}$. At this instant, the left side of tube 13 will be rendered conductive and as a result the voltage developed across cathode resistor 24 will cause the right side of tube 13 to be cut-off. The output from plate 16 will therefore be driven positive and a portion of this positive voltage will be applied to grid 20 through integrating circuit 14 so that the grid voltage $V_{g20}$ will now begin to increase towards the direct-current bias applied to grid 20 along the exponential charge characteristic of the integrating network comprising resistors 40 and 42 and capacitor 44. The right side of tube 13 will remain cut-off until the voltage on grid 18, and hence the voltage developed across cathode resistor 24, has decreased such that $V_{g18}-V_{g20}=V_{co}$. This point is reached at time $t_3$ where the discharge curve of $V_{g18}$ intersects the thick dashed curve representing $V_{g20}+V_{co}$. At this instant, the right side of tube 13 is again rendered conductive and the cycle is repeated. It can be seen that a triangular shaped voltage is developed across grid 20 and that the output from plate 16 is a series of negative pulses as shown in Fig. 2A. By increasing or decreasing the initial bias difference between grid 18 and 20, the frequency of the output pulses may be varied between a maximum and zero.

When the direct-current bias applied to grid 18 through resistors 36 and 38 is such that, without any input signal applied to the circuit, the pulse output repetition rate from plate 16 is between zero and maximum, then any modulating signal superimposed on this bias will cause the pulse output repetition rate from plate 16 to vary in accordance with the amplitude of the modulating signal. It is to be understood, of course, that the magnitude of the input or modulating signal is such that it will not drive the pulse generator beyond its limits of operation corresponding to zero and maximum repetition rate. If the initial bias on grid 18 is higher than the initial bias on grid 20, the output from plate 16 will be a series of negative pulses as shown. If, on the other hand, the initial bias on grid 20 is higher than that on grid 18, the pulse generator will operate in a like manner, but in this case the output from plate 16 will comprise a series of positive pulses.

Figure 3:
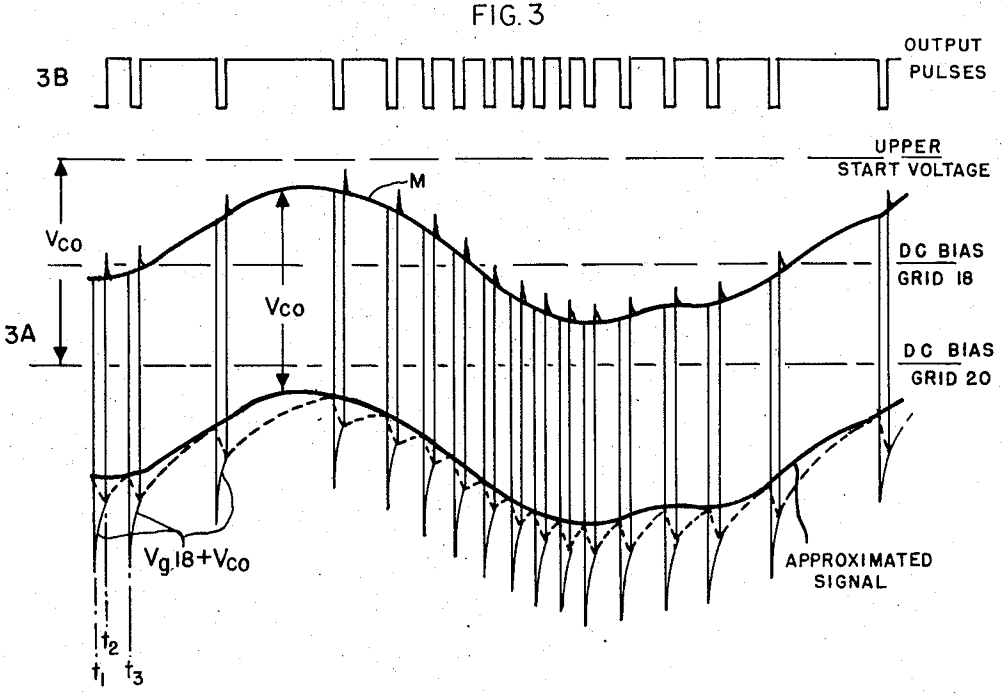

For an explanation of the operation of the pulse transmitter with an input modulation voltage M, but with no quantizing signal present, reference is made to Fig. 3. Let it be assumed that the direct-current biases on grids 18 and 20 are as shown in Fig. 3A with the upper start limit of pulse generator 12 being $V_{co}$ volts above the direct-current bias level applied to grid 20 as shown. At time $t_1$, let it be assumed that the difference between $V_{g20}$ and $V_{g18}$ is such that the right half of tube 13 is conducting. As hereinabove explained, a negative voltage will be generated at plate 16, grid 18 will be instantaneously driven below cut-off and grid 20 will charge exponentially in a negative direction toward the voltage level established by the voltage at the junction of resistors 26 and 28 and the voltage divider action of resistors 40 and 42. For effective operation, it is essential that the magnitude of the output pulses obtained at plate 16 be such that the maximal obtainable voltage at grid 20 be at least twice the value of $V_{co}$. The voltage representing $V_{g18}+V_{co}$ is shown in Fig. 3A to intersect the exponential negative charging voltage $V_{g20}$ at the instant $t_2$, at which time the right half of tube 13 will be rendered nonconductive and the left half will be rendered conductive. As a result, $V_{g18}$ is driven positive by the positive output from plate 16 and means may be provided in the usual manner to provide a very rapid discharge path at the positive peaks of $V_{g18}$. This may be accomplished by connecting a suitably connected rectifier or diode across the terminals of resistor 34. Grid 18 will now follow the input voltage M until such time that the voltage on grid 20, now charging exponentially in a positive direction towards its direct-current bias, reaches a value such that the difference between $V_{g20}$ and $V_{g18}$ is less than $V_{co}$. This point is reached at time $t_3$ at which time this cycle is again repeated. It can be seen that the curve connecting the high points of the triangular shaped voltages developed at grid 20 will approximate the input voltage on grid 18 and that a pulsed output will be obtained from plate 16 as shown in Fig. 3B, the negative pulses being generated when the difference between $V_{g18}$ and $V_{g20}$ is less than $V_{co}$. It has been mathematically determined that the output pulse repetition rate is such that the pulse density is proportional to the sum of the amplitude of the input modulating voltage and an amount which is proportional to the first derivative thereof. This may be expressed mathematically as $$\text{Pulse density}=K\left[\frac{1}{T}F(t)+F'(t)\right]$$

where T is the time constant of integrating network 14. This also indicates that it is possible to transmit direct-current inasmuch as the slope function will become zero for all direct-current values.

Figure 4:
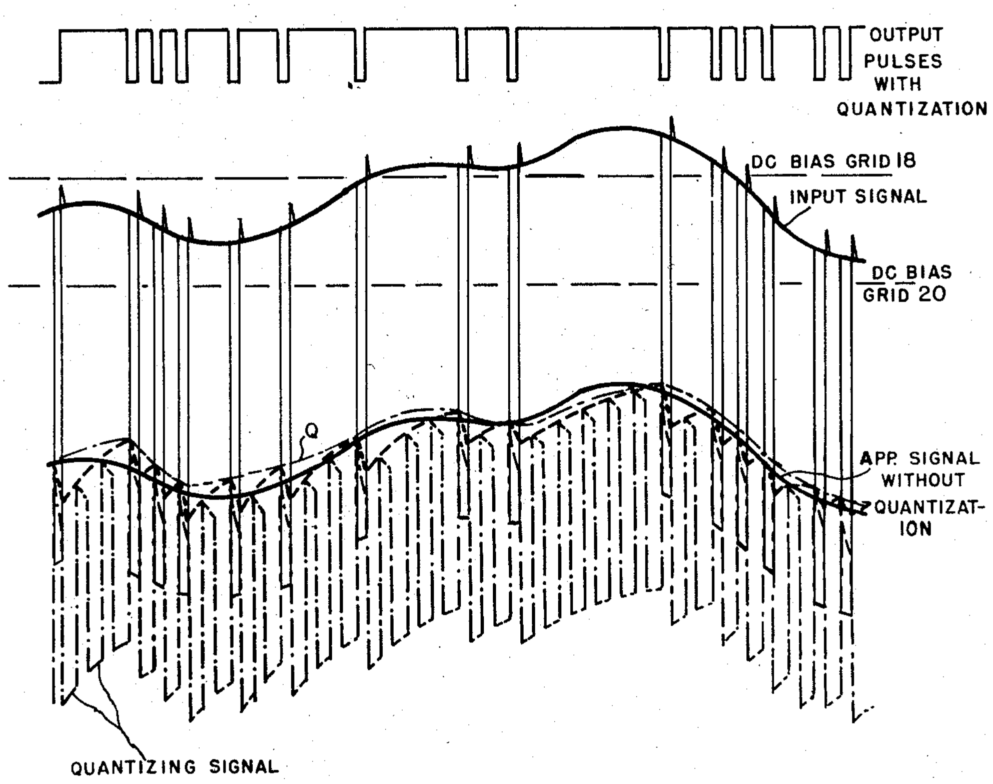

Fig. 4 illustrates the operation of the system with a quantizing signal applied to grid 20 from source 46. As can be seen, the quantizing signal is applied to the approximated signal voltage so that an output of plate 16 is only generated when the quantizing signal drives the approximated voltage to a value such that the difference between it and the input signal is less than cut-off voltage $V_{co}$. The broken line curve Q is now the reconstructed approximated signal and it can be seen that quantization has introduced an error when compared to the approximated signal without quantization. As is well known in the art, such quantization will, of course, provide a better indication of the intended level of the input modulating signal at a suitable receiver in the presence of noise occurring on the transmission medium.

Figure 5:
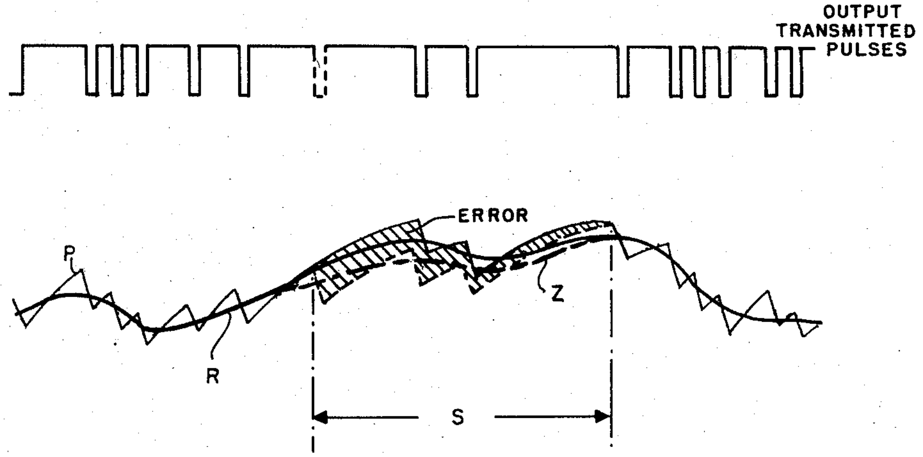

Fig. 5 illustrates the self correcting function of the present invention at the receiver. It is to be assumed that the transmitted signals are adapted to be detected at a suitable receiver having an integrating circuit with the same time constant as the integrating network 14. Fig. 5A illustrates the series of transmitted pulses and it is to be assumed that the pulse shown by the dashed lines is, for some reason, lost during transmission and is not detected at the receiver. The detected steps of the transmitted signal will now appear as indicated by the triangular shaped wave P with the detected modulating signal, after filtering, illustrated at R. The approximated signal at the transmitter which was desired to be reproduced includes the broken line curve Z. Due to the exponential shape of the steps detected at the receiver, the actually reproduced modulating signal and the desired reproduced modulating signal will have reached the same level after a prescribed duration S, so that the receiver no longer retains or remembers the error which occurred previously due to the missed pulse. It has been determined that if the duration S were equal to twice the time constant of the integrating network, then the error introduced by the missing pulse will be reduced by approximately a factor of 10.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A modulation system comprising, a pulse generator including a cathode follower and an output tube having discrete grids, discrete plates and a common cathode, a source of modulating signal voltage having its output applied to said cathode follower grid, means for coupling the output tube plate to the cathode follower grid whereby a differentiated voltage is applied from the output tube plate to the cathode follower grid, means for applying a portion of the output tube plate voltage to the output tube grid, said pulse generator being adapted to produce an output pulse from the output tube plate only when the difference between the voltage applied to said grids is less than a prescribed value, and an integrating circuit in circuit with said output tube grid and responsive to said output pulses for reconstructing said modulating signal substantially in the same form on said output tube grid and displaced from the modulating signal by said prescribed value.

2. The modulation system in accordance with claim 1 and further including means in circuit with the output tube grid for quantizing said reconstructed signal.

3. A modulation system comprising, a pulse generator including a cathode follower and an output tube having discrete grids, discrete plates, and a common cathode, a differentiating network in circuit with the output tube plate and the cathode follower grid, an integrating network in circuit with the output tube grid, a source of modulating voltage having its output applied to the cathode follower grid, and means for applying the pulse output from the output tube plate to said integrating network whereby the integrated voltage substantially approximates the modulating signal.

4. A modulation system comprising, a pulse generator including a cathode follower and an output tube having a common cathode, discrete grids and discrete plates, a source of modulating voltage having its output applied to said cathode follower grid, means for biasing said grids at discrete direct-current voltages, a differentiating network coupling the output tube plate voltage to said cathode follower grid, means for applying a portion of the output tube plate voltage to the output tube grid, said pulse generator being adapted to produce an output pulse from said output tube plate only when the difference between the voltages applied to said grid is less than a prescribed value, and a resistor-capacitor integrating circuit in circuit with said output tube grid and responsive to the output tube plate pulses whereby the output tube grid tends to charge exponentially towards its direct-current bias when no pulses are generated and exponentially towards the output tube plate voltage amplitude level when pulses are generated.

5. A modulation system comprising, a pulse generator including a cathode follower stage and an output tube stage having discrete grids, discrete plates and a common cathode, each stage of said pulse generator being adapted to respectively become conductive when the difference between the voltages on the respective grids and the cathode is less than a prescribed cut-off voltage, one stage being rendered conductive when the other stage is rendered non-conductive, a source of modulating voltage having its output applied to said cathode follower stage grid, a differentiating circuit interconnecting the cathode follower grid and the output tube plate, means for applying a portion of the output tube plate voltage to said output tube grid, and means in circuit with said output tube grid for integrating the pulses applied thereto whereby the modulating voltage is reconstructed in substantially the same form and displaced from the modulating voltage by the cut-off voltage.

6. A pulse generator comprising, a cathode follower and an output tube having discrete grids, discrete plates and a common cathode, said pulse generator having a prescribed cut-off voltage, means for coupling the output tube plate to the cathode follower grid whereby a differentiated voltage is applied from the output tube plate to the cathode follower grid, means for applying a portion of the output tube plate voltage to the output tube grid, and means in circuit with the output tube grid for integrating the voltage applied thereto, said pulse generator producing pulses only when the difference between the cathode follower grid voltage and the output tube grid voltage is less than said cut-off voltage.

7. A pulse generator comprising, a cathode follower and an output tube having discrete grids, discrete plates and a common cathode, a source of modulating voltage having its output applied to the cathode follower grid, and means for reconstructing said modulating voltage in substantially the same form at a prescribed voltage level displaced from the modulating voltage, said means comprising a differentiating network in circuit with the output tube plate and the cathode follower grid, and an integrating network responsive to the output of said output tube plate and connected to said grid, said pulse generator producing pulses at the output tube plate only when the difference between the cathode follower grid voltage and the output tube grid voltage is less than said prescribed voltage level.

8. The system in accordance with claim 7 and further including means in circuit with said integrating network for quantizing said reconstructed signal.

9. A system for converting a signal voltage to a binary pulse code comprising a pulse generator having a prescribed cut-off voltage and including a cathode follower and an output tube having discrete grids, discrete plates and a common cathode, said signal voltage being applied to the cathode follower control grid, a resistor-capacitor integrating circuit in circuit with said output tube grid and responsive to a portion of the output developed at said output tube plate, means for coupling the output tube plate to the cathode follower grid whereby a differentiated voltage is applied from the output tube plate to the cathode follower grid, said pulse generator producing pulses only when the difference between the cathode follower grid voltage and the output tube grid voltage is less than said cut-off voltage.

References Cited in the file of this patent

UNITED STATES PATENTS

| | | |
|---|---|---|
| 2,154,492 | Clough | Apr. 18, 1939 |
| 2,470,028 | Gordon | May 10, 1949 |
| 2,516,587 | Peterson | July 25, 1950 |
| 2,605,361 | Cutler | July 29, 1952 |
| 2,796,522 | Greenspan et al. | June 18, 1957 |
| 2,817,061 | Bowers | Dec. 17, 1957 |